US012312987B2

(12) United States Patent
Jambrosic et al.

(10) Patent No.: US 12,312,987 B2
(45) Date of Patent: May 27, 2025

(54) EXHAUST GAS TREATMENT ARRANGEMENT

(71) Applicant: Purem GmbH, Neunkirchen (DE)

(72) Inventors: Kresimir Jambrosic, Reichenbach an der Fils (DE); Bogdan Popescu, Laichingen (DE); Véronique Guérin, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 175 days.

(21) Appl. No.: 18/181,992

(22) Filed: Mar. 10, 2023

(65) Prior Publication Data

US 2023/0287820 A1 Sep. 14, 2023

(30) Foreign Application Priority Data

Mar. 10, 2022 (DE) .................... 10 2022 105 603.1

(51) Int. Cl.

*F01N 3/10* (2006.01)
*F01N 3/20* (2006.01)
*H01R 4/70* (2006.01)
*H01R 13/46* (2006.01)
*H01R 13/516* (2006.01)
*H05B 3/08* (2006.01)

(52) U.S. Cl.

CPC ......... *F01N 3/2013* (2013.01); *F01N 3/2026* (2013.01); *H01R 4/70* (2013.01); *H01R 13/46* (2013.01); *H01R 13/516* (2013.01); *H05B 3/08* (2013.01); *F01N 2240/16* (2013.01); *F01N 2390/02* (2013.01); *F01N 2550/22* (2013.01)

(58) Field of Classification Search

CPC .. F01N 3/2013; F01N 3/2026; F01N 2240/16; F01N 2390/02; F01N 2550/22; H01R 13/516; H05B 3/08
USPC ........................................................... 60/303
See application file for complete search history.

(56) References Cited

U.S. PATENT DOCUMENTS

| | | | | |
|---|---|---|---|---|
| 12,191,596 B2 * | 1/2025 | Johnson | ................. | H01R 43/04 |
| 2002/0009909 A1 * | 1/2002 | Kondoh | ................... | H01R 4/64 439/92 |
| 2002/0111071 A1 * | 8/2002 | Pade | .................. | G01N 27/4071 439/620.21 |
| 2020/0016654 A1 * | 1/2020 | Woodard | ................. | H05B 3/66 |
| 2020/0406190 A1 * | 12/2020 | Aufranc | ................. | B01D 53/94 |
| 2021/0172902 A1 * | 6/2021 | Watanabe | .............. | H01R 13/26 |
| 2021/0332728 A1 * | 10/2021 | Kurpejovic | ............. | F01N 3/027 |

(Continued)

FOREIGN PATENT DOCUMENTS

| | | |
|---|---|---|
| DE | 10 2014 000 966 A1 | 7/2015 |
| DE | 10 2020 111 777 A1 | 11/2021 |
| EP | 4 174 295 A1 | 5/2023 |

*Primary Examiner* — Erick R Solis
(74) *Attorney, Agent, or Firm* — Walter Ottesen, P.A.

(57) ABSTRACT

An exhaust gas treatment arrangement for an exhaust gas system of an internal combustion engine includes at least one electrically excitable heating unit having a heating region arranged in an exhaust gas guiding housing such that exhaust gas can flow thereover, and two connection regions passing through the exhaust gas guiding housing for connection to electrical connection lines running outside the exhaust gas guiding housing. A connection line installation aid is fixed with respect to the exhaust gas guiding housing and has at least one connection line positioning recess in an installation aid body for receiving a connection line to be connected to one of the connection regions.

19 Claims, 5 Drawing Sheets

(56) References Cited

U.S. PATENT DOCUMENTS

| | | | | |
|---|---|---|---|---|
| 2021/0340894 | A1 | 11/2021 | Neumann et al. | |
| 2023/0137839 | A1 | 5/2023 | Brenner | |
| 2023/0151749 | A1* | 5/2023 | Rohde | F01N 3/103 422/177 |
| 2023/0307865 | A1* | 9/2023 | Sommier | H01R 13/50 |
| 2023/0323800 | A1* | 10/2023 | Akyildiz | F01N 13/009 60/297 |
| 2024/0421528 | A1* | 12/2024 | Kumakura | H01R 43/20 |

* cited by examiner

EXHAUST GAS TREATMENT ARRANGEMENT

CROSS-REFERENCE TO RELATED APPLICATIONS

This application claims priority of German patent application no. 10 2022 105 603.1, filed Mar. 10, 2022, the entire content of which is incorporated herein by reference.

TECHNICAL FELD

The present disclosure relates to an exhaust gas treatment arrangement for an exhaust gas system of an internal combustion engine.

BACKGROUND

To reduce the emission of pollutants from internal combustion engines, exhaust gas treatment units, for example catalytic converters or particle filters, are used in exhaust gas systems. In order to bring the exhaust gas treatment units rapidly to operating temperature particularly at comparatively low ambient temperatures, it is known to provide at least one heating unit upstream of such an exhaust gas treatment unit in the exhaust gas flow, the heating unit, when electrically excited, transmitting heat to the gas flowing around it, in particular the exhaust gas emitted by an internal combustion engine. This heat can be transmitted to the exhaust gas treatment unit following downstream and can bring the latter rapidly to an operating temperature required for carrying out a catalytic reaction.

SUMMARY

It is an object of the present disclosure to provide an exhaust gas treatment arrangement in which a defined positioning of the connection lines provided for connection of a heating unit to a voltage source can be reliably achieved and maintained.

According to the disclosure, this object is achieved by an exhaust gas treatment arrangement for an exhaust gas system of an internal combustion engine, including at least one electrically excitable heating unit having a heating region arranged in an exhaust gas guiding housing such that exhaust gas can flow around it, and two connection regions passing through the exhaust gas guiding housing for connection to electrical connection lines running outside the exhaust gas guiding housing, and furthermore including a connection line installation aid element which is fixed with respect to the exhaust gas guiding housing and has at least one connection line positioning recess in an installation aid element body for receiving a connection line to be connected to one of the connection regions.

The use of the connection line installation aid element ensures that whenever, for example after integration of an exhaust gas system containing an exhaust gas treatment arrangement according to the disclosure in a vehicle, a heating unit is electrically conductively connected to a voltage source or to a control device applying an operating voltage to it, the connection cables used for this purpose are held, particularly in that region in which they adjoin the connection regions of the heating unit, that is, in the connection end regions of same, in a defined positioning which is not adversely affected by the connection operation and also reliably remain in the positioning after the installation operation has been carried out.

In order to be able to use the advantages of the present disclosure in each connection line, the connection line installation aid element can have a connection line positioning recess in association with each connection line to be connected to one of the connection regions.

Positioning avoiding mutual disturbance of the connection lines can be achieved by the fact that the connection line positioning recesses are arranged with positioning recess longitudinal axes substantially parallel to one another.

In order to be able to introduce a connection line in a simple manner into the positioning recess associated therewith, the at least one connection line positioning recess can include a groove-like hollow which is open in a direction away from an outer side of the exhaust gas guiding housing.

A configuration protecting against external influences and in particular also ensuring electrical insulation in the region of the connection end regions of the connection lines can make provision that the at least one connection line positioning recess is configured for substantially completely receiving a connection end region of a connection line, which connection end region is to be electrically conductively connected to one of the connection regions.

For this purpose, provision can be made, for example, that the at least one connection line positioning recess includes a line receiving portion for receiving a line region of the connection end region of the connection line and a connection element receiving portion adjoining the line receiving portion for receiving a connection element of the connection end region of the connection line, which connection element adjoins the line region and is to be electrically conductively connected to one of the connection regions.

Since, in general, a connection line wherever it is to be connected to a connection region of a heating unit is larger than in its line region leading to a voltage source or a control device, it is proposed that the connection element receiving portion is larger transversely with respect to the positioning recess longitudinal axis than the line receiving portion.

A configuration protecting against external influences to an increased extent can be achieved if the connection line installation aid element includes an installation aid element cover, the at least one connection line positioning recess being substantially completely closed when the installation aid element cover is attached to the installation aid element body, or/and a connection end region of a connection line, which connection end region is positioned in the at least one connection line positioning recess, is substantially completely surrounded by the connection line installation aid element.

For the fixed attachment of the connection line installation aid element in the region of the exhaust gas treatment arrangement, a fastening region can be provided on the installation aid element body.

In a configuration which is simple to realize and is equally highly stable, the fastening region can include a plurality of fastening portions which are fixed by fastening members to the exhaust gas guiding housing or/and to a casing surrounding the exhaust gas guiding housing at least in regions.

In an alternative configuration of an exhaust gas treatment arrangement which is advantageous in particular in respect of the achievable electrical insulation of connection end regions, the fastening region in the case of at least one, preferably each connection line positioning recess can include a connection pin passage opening which is open to the connection element receiving portion and through which a connection pin from one of the connection regions passes.

The connection line installation aid element can preferably be constructed with electrically insulating material, preferably plastics material. The connection line installation aid element can be formed completely from such electrically insulating material, for example as a material block, that is, substantially monolithically, or can be coated with such material at least in the regions in which an electrically insulating effect is required.

In the case of the exhaust gas treatment arrangement according to the disclosure, at least one exhaust gas treatment unit, preferably catalytic converter or/and particle filter, can be arranged downstream of the at least one heating unit in an exhaust gas flow direction.

The disclosure furthermore relates to a connection line installation aid element, preferably for an exhaust gas treatment arrangement constructed according to the disclosure, including at least one connection line positioning recess for receiving a connection line to be connected to a connection region of an exhaust gas treatment arrangement in an installation aid element body.

It should be pointed out that such a connection line installation aid element with all of the previously explained configuration features specific thereto can be constructed individually or in any combination. In particular, the connection line installation aid element can be distinguished in that:

two connection line positioning recesses having positioning recess longitudinal axes substantially parallel to one another are configured as groove-like hollows open substantially transversely with respect to the positioning recess longitudinal axes in the installation aid element body, or/and the at least one connection line positioning recess is configured for substantially completely receiving a connection end region of a connection line, which connection end region is to be electrically conductively connected to a connection region of an exhaust gas treatment arrangement, or/and a fastening region for fixedly attaching the connection line installation aid element is provided on the installation aid element body, or/and an installation aid element cover substantially completely closing the at least one connection line positioning recess is provided on the installation aid element body.

The disclosure furthermore relates to an exhaust gas system for an internal combustion engine, including at least one exhaust gas treatment arrangement constructed according to the disclosure, wherein a connection line received in a connection line positioning recess of the connection line installation aid element is connected to each connection region.

BRIEF DESCRIPTION OF DRAWINGS

The invention will now be described with reference to the drawings wherein.

DETAILED DESCRIPTION

Figure 1:
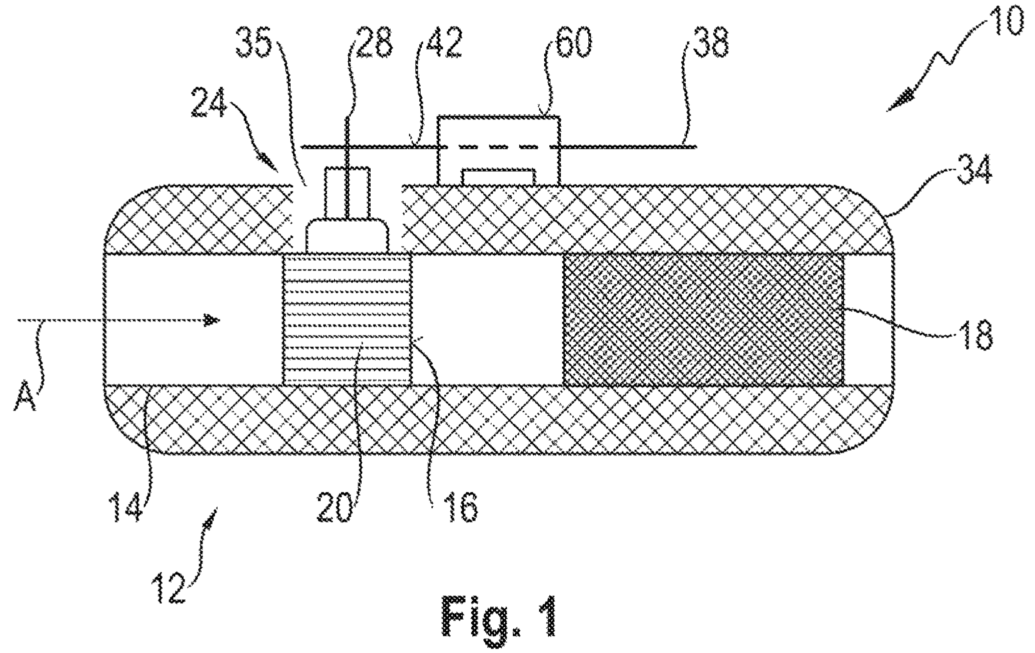
FIG. 1 shows, in a diagrammatic longitudinal sectional view, an exhaust gas treatment arrangement of an exhaust gas system of an internal combustion engine.

FIG. 1 shows, in a diagrammatic illustration, a section of an exhaust gas system, denoted in general by 10, of an internal combustion engine. The section illustrated shows an exhaust gas treatment arrangement 12, in which an exhaust gas heating unit 16 is arranged upstream of an exhaust gas treatment unit 18 in an exhaust gas flow direction A in an exhaust gas guiding housing 14 of tubular configuration, for example. The exhaust gas treatment unit 18 can include, for example, a catalytic converter, in particular oxidation catalytic converter or SCR catalytic converter, a particle filter or the like.

The exhaust gas heating unit 16 includes a heating region 20 in the exhaust gas guiding housing 14, around which heating region 20 the exhaust gas emitted by an internal combustion engine can flow and which heating region 20 can be formed, for example, by a jacket heating conductor or the like. For supply with electrical energy, the exhaust gas heating unit 16 furthermore has a respective connection region 22, 24 passing through the exhaust gas guiding housing 14 for connection to each pole of a voltage source. In each of the two connection regions 22, 24, which can also be seen in FIG. 2, an electrically conductive connection pin 26, 28 passes in an electrically insulated manner through a respective lug 30, 32 on the exhaust gas guiding housing 14.

In the embodiment of an exhaust gas treatment arrangement 12 illustrated in the figures, the exhaust gas guiding housing 14, which is of tubular configuration and is optionally assembled from a plurality of parts, is surrounded on its outer side by a casing 34 which surrounds the latter at least in regions and therefore is also thermally insulating. In the region of the connection regions 22, 24, a recess 35 is formed in the casing 34, which is constructed, for example, from a plurality of parts, through which recess 35 the connection regions 22, 24 extend and can therefore be electrically conductively connected to the connection lines 36, 38 leading to a voltage source, a control device or the like.

Figure 2:
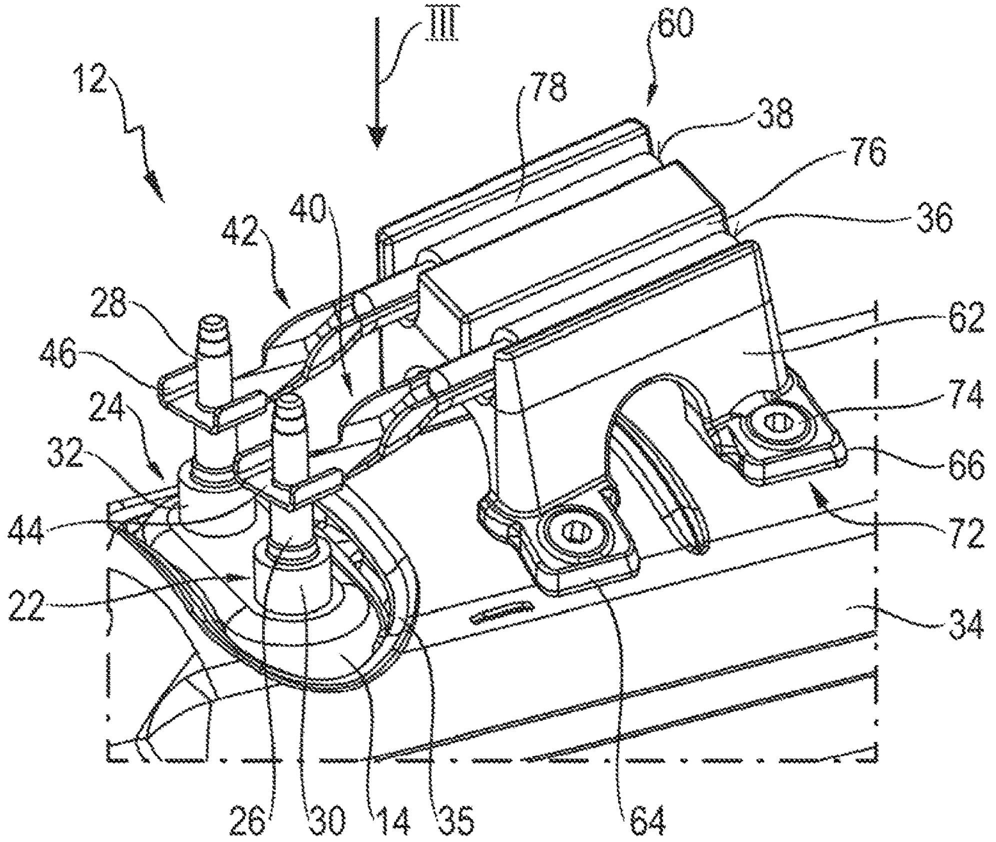
FIG. 2 shows a detailed view of an exhaust gas treatment arrangement with a connection line installation aid element.
Figure 3:
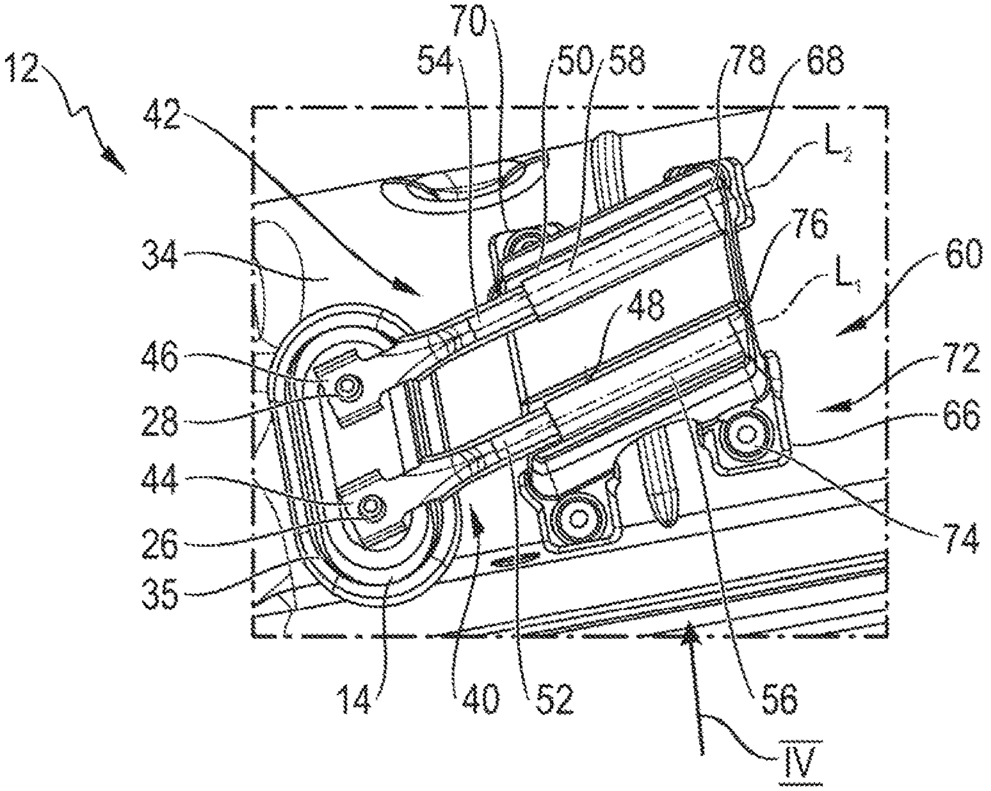
FIG. 3 shows a view of the exhaust gas treatment arrangement illustrated in FIG. 2 in viewing direction III in FIG. 2.
Figure 4:
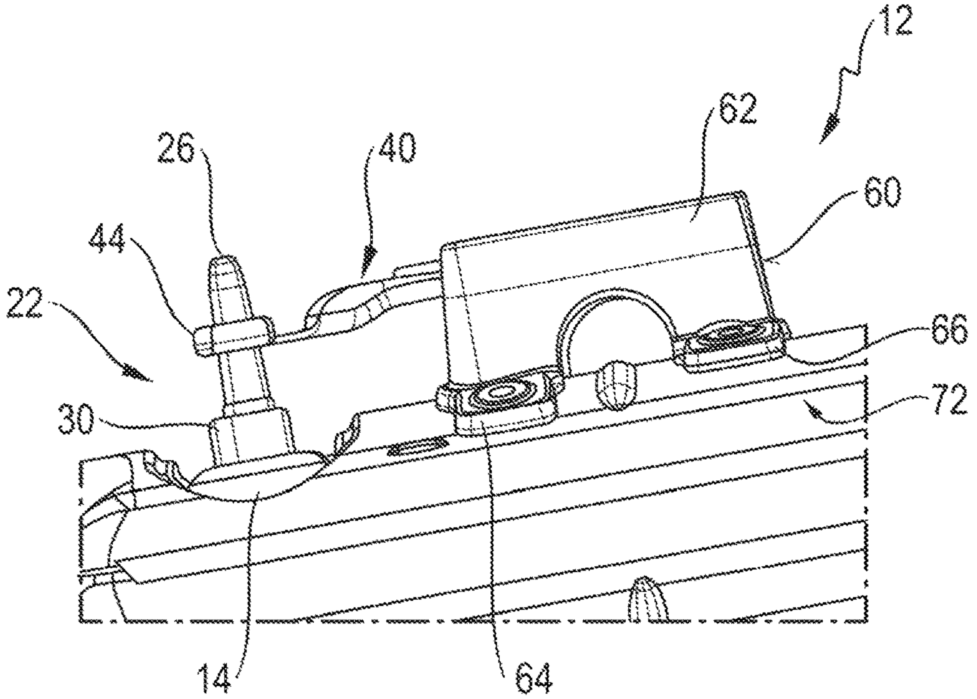
FIG. 4 shows a view of the exhaust gas treatment arrangement illustrated in FIG. 3 in viewing direction IV in FIG. 3.

Each of the connection lines 36, 38 illustrated in FIGS. 2 to 4 in conjunction with a first embodiment of the exhaust gas treatment arrangement 12 has a connection element 44, 46, which is provided, for example, in the form of a sheet metal formed part and is configured in the manner of an eyelet, in a respective connection end region 40, 42. Each of the connection elements 44, 46 has an opening through which a respective connection pin 26, 28 of the connection regions 22, 24 can be guided. By screwing on a nut element, not illustrated in the figures, or the like, the connection elements 44, 46 can be electrically conductively fixed to the respectively associated connection pins 26, 28, their being pressed, for example, against a, for example, step-like or conical, radial widened portion formed on the connection pins 26, 28 or being pressed, for example, against the lugs 30, 32 if the latter extend correspondingly far outward from the exhaust gas guiding housing 14.

In the connection end regions 40, 42 of the connection lines 36, 38, a conductor region, denoted in general by 48, 50, is connected to each connection element 44, 46, for example as a result of a respective connection element 44, 46 being pressed against the connection end regions 40, 42 in a manner engaging around a conductor wire 52, 54 of the respective conductor region 48, 50. In the conductor regions leading away from the connection elements 44, 46, the conductor wires 52, 54 are surrounded by an electrically insulating jacket 56, 58.

In order, when the connection lines 36, 38 are installed on the exhaust gas treatment unit 12, already integrated, for example together with the exhaust gas system 10, in a vehicle, to ensure that, in particular when the connection elements 44, 46 are fixed to the connection pins 26, 28, the connection lines 36, 38 remain in a defined positioning, the exhaust gas treatment arrangement 12 includes a connection line installation aid element, denoted in general by 60. The connection line installation aid element 60 illustrated in FIGS. 2 to 4 includes an installation aid element body 62 which is constructed, preferably integrally, that is, monolithically, from an electrically insulating material, for example plastics material or the like. In the embodiment illustrated in FIGS. 2 to 4, the installation aid element body 62 is fixed to the outer side of the casing 34 in a fastening region 72 including four fastening portions 64, 66, 68, 70. Use can be made, for this purpose, of fastening members 74, for example, fastening rivets or fastening screws, which pass through fastening portions 64, 66, 68, 70 and also the casing 34 or are introduced into the casing 34.

In the region adjoining the four fastening portions 64, 66, 68, 70, which are configured in the manner of feet, the installation aid element body 62 has a connection line positioning recess 76, 78 in association with each of the two connection lines 36, 38. The positioning recesses are each extended longitudinally in the direction of a positioning recess longitudinal axis $L_1$, $L_2$ and are open both in the axial direction and in a direction away from the casing 34 or from the exhaust gas guiding housing 14 and are therefore configured as groove-like hollows. Each of the connection lines 36, 38 is positioned in a manner engaging in one of the connection line positioning recesses 76, 78 and is held therein substantially transversely with respect to the respective positioning recess longitudinal axis $L_1$, $L_2$ and substantially also parallel to a surface of the casing 34 or of the exhaust gas guiding housing 14. The transverse dimension of the connection line positioning recesses 76, 78 can be coordinated with the diameter of the conductor regions 48, 50 of the connection lines 36, 38 in such a manner that the latter are clamped in the respectively associated connection line positioning recesses 76, 78. However, such a clamping action is not absolutely necessary for achieving and maintaining a defined positioning of the connection lines 36, 38, in particular in their connection end regions 40, 42, which can be seen in FIGS. 2 and 3, with regard to the connection regions 22, 24 or of the exhaust gas guiding housing 14.

Via the connection line installation aid element 60, during and after the installation, the connection lines 36, 38 are held in a defined positioning with respect to one another and with respect to the exhaust gas treatment arrangement 12. The risk that, during or after the installation and in particular during operation of a vehicle, damage to the connection lines 36, 38 or a short circuit occurs because of undefined movements of the connection lines 36, 38, in particular in the connection end regions 40, 42, is therefore prevented. Via the connection line installation aid element 60, a defined positioning of the connection end regions 40, 42 is predetermined not only substantially transversely with respect to the connection pins 26, 28, but also in the longitudinal direction of the connection pins 26, 28, and therefore the connection elements 44, 46 are also held in the longitudinal direction of the connection pins 26, 28 in the positioning required for correctly fastening thereto.

Figure 5:
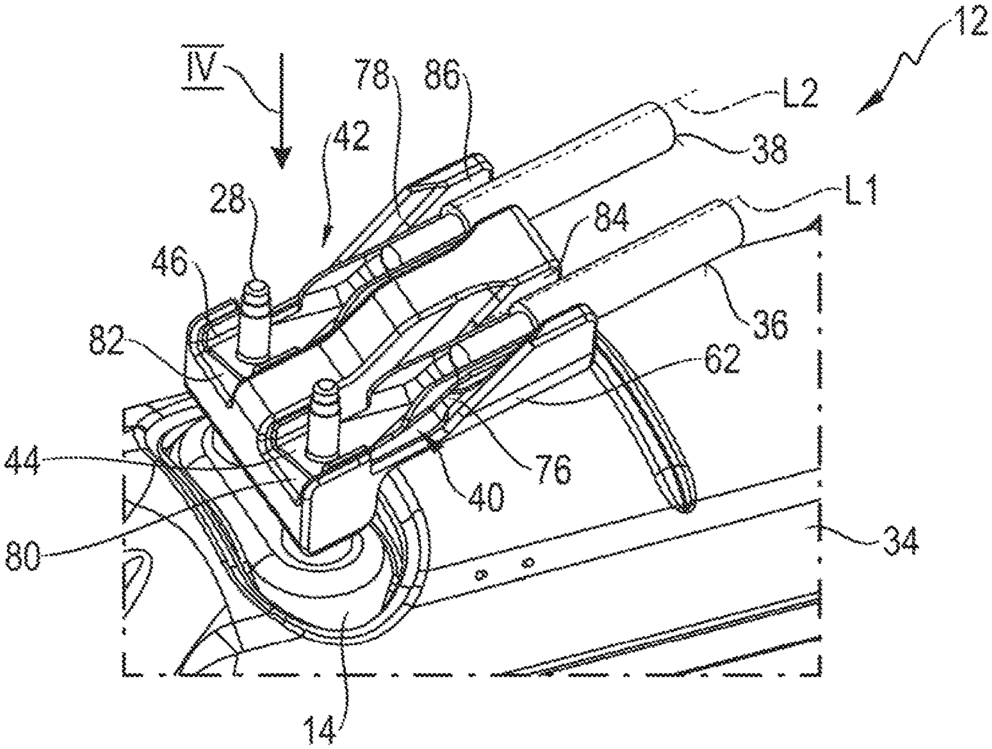
FIG. 5 shows a view corresponding to FIG. 2 of an alternative configuration of an exhaust gas treatment arrangement.
Figure 6:
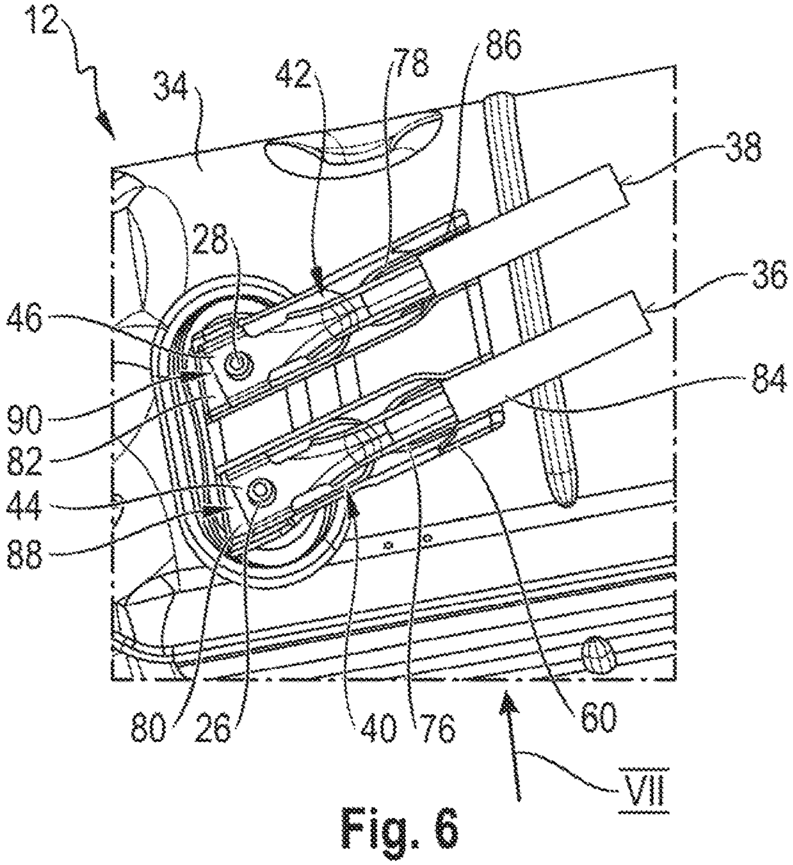
FIG. 6 shows a view of the exhaust gas treatment arrangement of FIG. 5 in viewing direction VI in FIG. 5.

An alternative embodiment of an exhaust gas treatment arrangement 12 and of a connection line installation aid element is illustrated in FIGS. 5 to 6. In the embodiment illustrated in these figures, the connection line positioning recesses 76, 78 formed in the installation aid element body 62 are configured in such a manner that they receive the entire connection end regions 40, 42 of the connection lines 36, 38, and therefore the lines 36, 38 in the region of their connection end regions 40, 42 substantially do not protrude over the outer circumferential contour of the installation aid element body 62. This ensures even better protection and in particular an improved insulating effect in those regions in which the connection lines 36, 38 are connected to the connection pins 26, 28.

The two connection line positioning recesses 76, 78, which are arranged substantially parallel next to one another and are open in a direction away from the casing 34 or the exhaust gas guiding housing 14 and are provided in the form of groove-like hollows, include a connection element receiving portion 80, 82 in which the connection element 44, 46 of the connection end region 40, 42 received in a respective connection line positioning recess 76, 78 is positioned. The respective connection element receiving portion 80, 82 is adjoined by a line region receiving portion 84, 86 in which the conductor region 48, 50 adjoining the respective connection element 44, 46 extends or is held substantially transversely with respect to the respective positioning recess longitudinal axis $L_1$, $L_2$.

Figure 7:
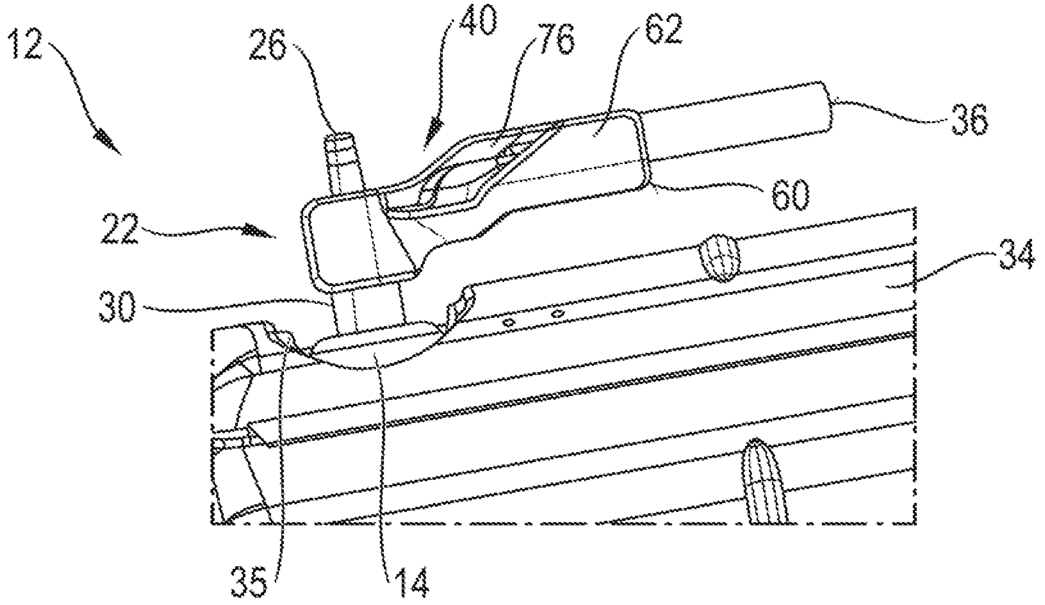
FIG. 7 shows a view of the exhaust gas treatment arrangement of FIG. 6 in viewing direction VII in FIG. 6.

In order to fix the connection line installation aid element 60, which is illustrated in FIGS. 5 to 7, to the exhaust gas treatment arrangement 12, in this embodiment the fastening region 72 in association with each connection pin 26, 28 includes a connection pin passage opening 88, 90 through which the connection pin 26, 28 reaches. The fastening region 72 of the installation aid element body 62 is pushed onto the connection pins 26, 28 in such a manner that they pass through the connection pin passage openings 88, 90, which are each open to one connection element receiving portion 80, 82, and protrude in the region of the connection element receiving portions 80, 82 out of the installation aid element body 62 resting on the lugs 30, 32. If the installation aid element body 62 is positioned on the connection regions 22, 24 in this way, the connection lines 36, 38 can be placed into the respectively associated connection line positioning recesses 76, 78 such that the openings formed in the connection elements 44, 46 are guided over the connection pins 26, 28. Subsequently, for example, a nut element can be screwed onto each of the connection pins 26, 28 in order to use the nut element to press the respectively associated connection element 44, 46 against the installation aid element body 62 and to press the latter against the lugs 30, 32. In this way, the installation aid element body 62 is held fixedly on the connection regions 22, 24 of the exhaust gas treatment arrangement 12, and the connection lines 36, 38, as also described previously with reference to FIGS. 2 to 4, are held in their connection end regions 40, 42 in a defined manner with respect to one another and with respect to the exhaust gas treatment arrangement 12.

Figure 8:
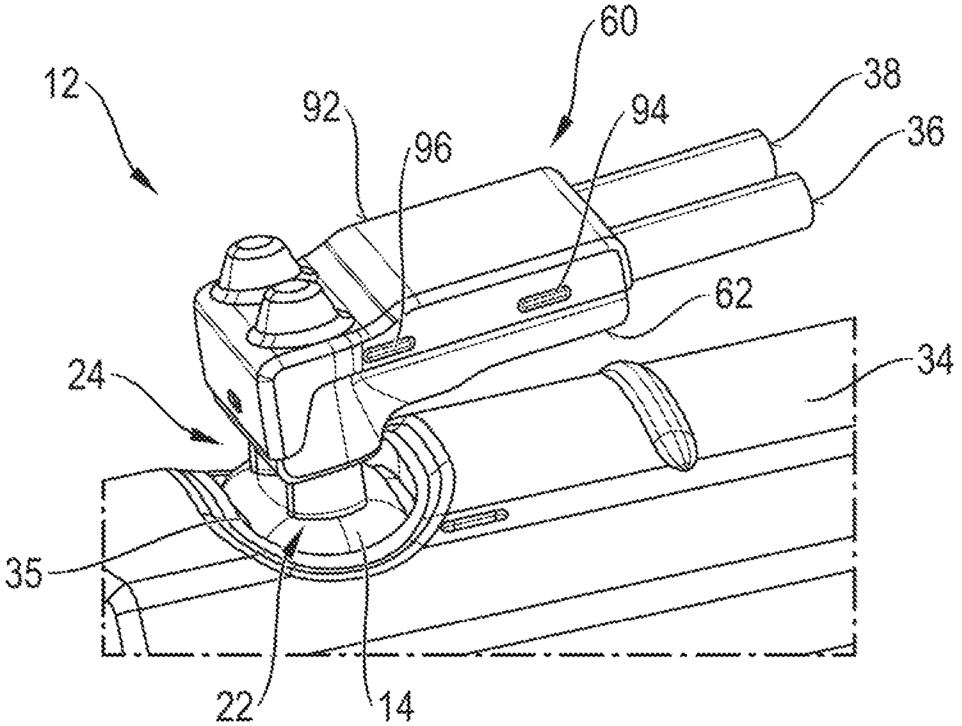
FIG. 8 shows a further view, corresponding to FIG. 2, of an alternative configuration of an exhaust gas treatment arrangement; and, FIG. 9 shows the exhaust gas treatment arrangement of FIG. 8 with an installation aid element cover removed from an installation aid element body.
Figure 9:
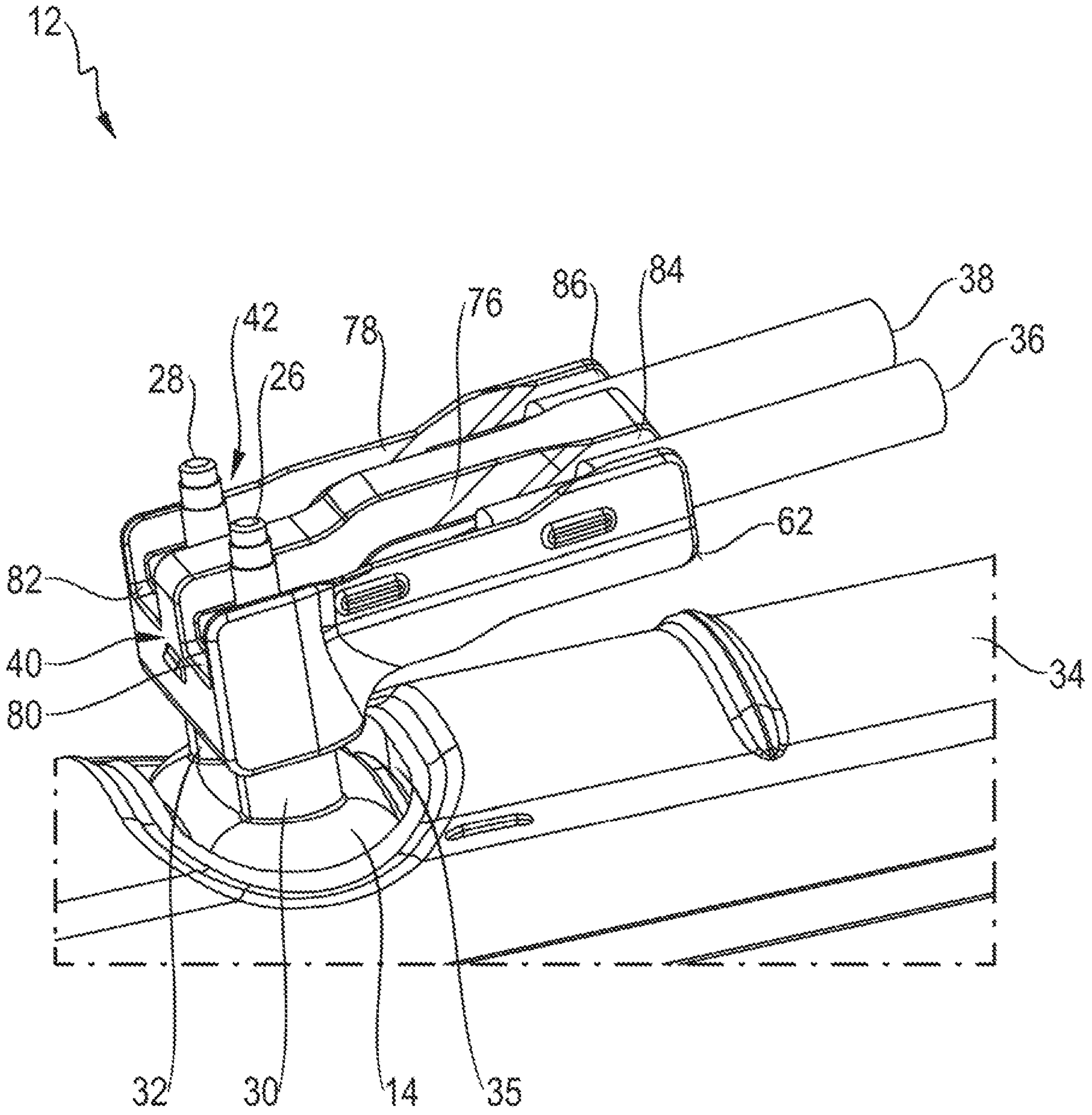

A further embodiment of an exhaust gas treatment arrangement 12 and of a connection line installation aid element 60 is illustrated in FIGS. 8 and 9. The installation aid element body 62 substantially corresponds to the configuration illustrated previously with reference to FIGS. 5 to 7 and, in the region of each connection line positioning recess 76, 78, in each case has the line receiving portion 84, 86 and the connection element receiving portion 80, 82 respectively adjoining the latter. In this embodiment too, the connection end regions 40, 42 of the connection lines 36, 38 are received substantially completely in the contour of the installation aid element body 62 and are already held by the latter in a manner substantially completely electrically insulated from the outside.

In the embodiment illustrated in FIGS. 8 and 9, the connection line installation aid element 60 furthermore includes an installation aid element cover 92. The latter, like the installation aid element body 62, is preferably constructed with electrically insulating material, for example plastics material, and can be fixed by latching, via a plurality of latching formations 94, 96, to the installation aid element body 62. As can clearly be seen in FIG. 8, when the installation aid element cover 92 is fixed to the installation aid element body 62, each of the connection line positioning recesses 76, 78 formed in the installation aid element body 62 are substantially completely closed to the outside by the installation aid element cover 92 such that a correspondingly complete electrical insulation of the connection end regions 40, 42 and in particular protection of same against external influences, for example, moisture or the like, can be achieved. Only at the location where the conductor regions 48, 50 of the connection lines 36, 38 are guided out of the installation aid element body 62 are the connection line positioning recesses 76, 78 in each case open in the direction of their positioning recess longitudinal axis.

In the case of the configuration according to the disclosure of an exhaust gas treatment unit or a connection line installation aid element for an exhaust gas treatment arrangement, a defined positioning of the connection end regions of the connection lines for a heating unit of an exhaust gas treatment arrangement is achieved with structurally simple measures which, however, can nevertheless be robust. At the same time, the connection end regions of the connection lines can be electrically insulated in relation to one another and from the outside and protected against external influences.

It is understood that the foregoing description is that of the preferred embodiments of the invention and that various changes and modifications may be made thereto without departing from the spirit and scope of the invention as defined in the appended claims.

The invention claimed is:

1. An exhaust gas treatment arrangement for an exhaust gas system of an internal combustion engine, the exhaust gas treatment arrangement comprising:

an exhaust gas guiding housing for conducting a flow of exhaust gas therethrough;

at least one electrically excitable heater having a heating region arranged in said exhaust gas guiding housing so as to permit said flow of exhaust gas to pass thereover;

first and second connection regions passing through said exhaust gas guiding housing for accommodating a connection to electrical connection lines running outside of said exhaust gas guiding housing;

a connection line installation aid defining a body and being fixed with respect to said exhaust gas guiding housing; and, said body having at least one connection line positioning recess formed therein for receiving one of said first and second electrical connection lines therein to facilitate connection to one of said connection regions.

2. The exhaust gas treatment arrangement of claim 1, wherein said connection line installation aid has two of said connection line positioning recesses in association with corresponding ones of said connection lines to be connected to corresponding ones of said connection regions.

3. The exhaust gas treatment arrangement of claim 2, wherein said connection line positioning recesses define respective longitudinal axes parallel to one another.

4. The exhaust gas treatment arrangement of claim 1, wherein said at least one connection line positioning recess is configured as a groove-like hollow open in a direction away from an outer side of said exhaust gas guiding housing.

5. The exhaust gas treatment arrangement of claim 2, wherein each of said connection lines has a connection end region for connection to one of said first and second connection regions; and, said at least one connection line positioning recess is configured to receive a corresponding one of said connection end regions therein.

6. The exhaust gas treatment arrangement of claim 5, wherein:

each of said connection lines has a connection end region and said connection region has a line region;

each of said connection end regions has a connection element;

each of said connection line positioning recesses includes a line receiving portion for receiving said line region of said connection end region of said connection line;

each of said connection line positioning recesses further includes a connection element receiving portion adjoining the corresponding line receiving portion for receiving the connection element of the corresponding connection end region of said connection line; and, each of said connection elements adjoins the corresponding line region and is electrically conductively connectable to one of said connection regions.

7. The exhaust gas treatment arrangement of claim 6, wherein said connection element receiving portions are each larger transversely with respect to the corresponding positioning recess longitudinal axis than the line receiving portion corresponding thereto.

8. The exhaust gas treatment arrangement of claim 6, wherein said connection line installation aid further includes at least one of the following:

i) a cover attachable to said body to close the at least one connection line positioning recess when attached to said body; and, ii) said connection end region of each of said connection lines is positioned in a corresponding one of said connection line positioning recesses so as to be surrounded by said connection line installation aid.

9. The exhaust gas treatment arrangement of claim 1, wherein a fastening region for fixedly attaching the connection line installation aid is provided on said body.

10. The exhaust gas treatment arrangement of claim 9, further comprising a casing surrounding said exhaust gas guiding housing; said fastening region including a plurality of fastening portions fixed by fastening members to at least one of the following: i) said exhaust gas guiding housing; and, said casing surrounding the exhaust gas guiding housing at least in regions.

11. The exhaust gas treatment arrangement of claim 9, wherein said fastening region includes a connection pin passage opening which is open to a connection element receiving portion and through which a connection pin from one of the connection regions passes.

12. The exhaust gas treatment arrangement of claim 1, wherein said connection line installation aid is made with electrically insulating material.

13. The exhaust gas treatment arrangement of claim 12, wherein said elastically insulating material is plastics material.

14. The exhaust gas treatment arrangement of claim 1, wherein at least one exhaust gas treatment unit is arranged downstream of said at least one heater in an exhaust gas flow direction.

15. The exhaust gas treatment arrangement of claim 14, wherein said at least one exhaust gas treatment unit is at least one of the following: a catalytic converter and a particle filter.

16. A connection line installation aid for an exhaust gas treatment arrangement including:

an exhaust gas guiding housing for conducting a flow of exhaust gas therethrough;

at least one electrically excitable heater having a heating region arranged in said exhaust gas guiding housing so as to permit said flow of exhaust gas to pass thereover;

first and second connection regions passing through said exhaust gas guiding housing for accommodating a connection to electrical connection lines running outside of said exhaust gas guiding housing;

the connection line installation aid defining a body and being fixed with respect to said exhaust gas guiding housing; and, said body having at least one connection line positioning recess formed therein for receiving one of said electrical connection lines therein to facilitate connection to one of said connection regions; and, the connection line installation aid comprising:

said at least one connection line positioning recess in said body being configured for receiving said connection lines to be connected to one of said first and second connection regions of said exhaust gas treatment arrangement.

17. The connection line installation aid of claim 16, wherein at least one of the following applies:

i) two connection line positioning recesses having positioning recess longitudinal axes substantially parallel to one another are configured as groove-like hollows open transversely with respect to the positioning recess longitudinal axes in the body;

ii) the at least one connection line positioning recess is configured for receiving a connection end region of a corresponding one of said electrical connection lines, which connection end region is to be electrically conductively connected to a connection region of said exhaust gas treatment arrangement;

iii) a fastening region for fixedly attaching the connection line installation aid is provided on said body; and, iv) a cover closing the at least one connection line positioning recess is provided on said body.

18. The connection line installation aid of claim 16, wherein an exhaust gas treatment unit is at least one of the following: a catalytic converter and a particle filter.

19. An exhaust gas system for an internal combustion engine comprising:

at least one exhaust gas treatment arrangement including:

an exhaust gas guiding housing for conducting a flow of exhaust gas therethrough;

at least one electrically excitable heater having a heating region arranged in said exhaust gas guiding housing so as to permit said flow of exhaust gas to pass thereover;

first and second connection regions passing through said exhaust gas guiding housing for accommodating a connection to electrical connection lines running outside of said exhaust gas guiding housing;

a connection line installation aid defining a body and being fixed with respect to said exhaust gas guiding housing;

said body having at least one connection line positioning recess formed therein for receiving one of said electrical connection lines therein to facilitate connection to one of said connection regions; and, a connection line received in said connection line positioning recess of the connection line installation aid being connected to one of said first and second connection regions.

* * * * *